United States Patent
Liu et al.

(10) Patent No.: US 11,511,522 B2
(45) Date of Patent: Nov. 29, 2022

(54) HIGH PERFORMANCE PHOTOCURABLE OPTICALLY CLEAR ADHESIVE

(71) Applicant: 3M INNOVATIVE PROPERTIES COMPANY, St. Paul, MN (US)

(72) Inventors: Lan Hong Liu, Rosemount, MN (US); Jianhui Xia, Woodbury, MN (US); Thomas P. Klun, Lakeland, MN (US); David A. Kowitz, St. Paul, MN (US); Audrey A. Sherman, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 566 days.

(21) Appl. No.: 16/486,993

(22) PCT Filed: Feb. 28, 2018

(86) PCT No.: PCT/US2018/020082
§ 371 (c)(1),
(2) Date: Aug. 19, 2019

(87) PCT Pub. No.: WO2018/160614
PCT Pub. Date: Sep. 7, 2018

(65) Prior Publication Data
US 2020/0017720 A1    Jan. 16, 2020

Related U.S. Application Data

(60) Provisional application No. 62/466,664, filed on Mar. 3, 2017.

(51) Int. Cl.
| | | |
|---|---|---|
| *B32B 17/10* | (2006.01) | |
| *B32B 7/12* | (2006.01) | |
| *B32B 27/36* | (2006.01) | |
| *C09J 4/06* | (2006.01) | |
| *C09J 9/00* | (2006.01) | |
| *A47L 19/02* | (2006.01) | |
| *A47G 21/14* | (2006.01) | |
| *B29C 69/00* | (2006.01) | |

(52) U.S. Cl.
CPC .............. *B32B 17/10* (2013.01); *A47G 21/14* (2013.01); *A47L 19/02* (2013.01); *B32B 7/12* (2013.01); *B32B 27/36* (2013.01); *C09J 4/06* (2013.01); *C09J 9/00* (2013.01); *B29C 69/00* (2013.01); *B32B 2255/10* (2013.01); *B32B 2255/26* (2013.01); *B32B 2307/412* (2013.01); *B32B 2315/08* (2013.01); *B32B 2367/00* (2013.01); *B32B 2457/20* (2013.01)

(58) Field of Classification Search
CPC ...... C09J 175/14; C09J 129/14; C09J 175/10; C09J 129/02
See application file for complete search history.

(56) References Cited

U.S. PATENT DOCUMENTS

| | | |
|---|---|---|
| 4,937,147 A | 6/1990 | Cartier |
| 7,585,570 B2 | 9/2009 | Takeko |
| 2009/0029100 A1 | 1/2009 | Wigdorski |
| 2010/0247940 A1 | 9/2010 | Takahashi |
| 2011/0206869 A1 | 8/2011 | Nemoto |
| 2012/0165465 A1 | 6/2012 | Kim |
| 2015/0075710 A1* | 3/2015 | Lu .................. C09J 147/00 522/18 |
| 2016/0002418 A1 | 1/2016 | Steelman |
| 2016/0108298 A1* | 4/2016 | Berzon ............ B32B 37/1284 428/354 |
| 2017/0101559 A1* | 4/2017 | Takamori ........... B31F 1/2818 |

FOREIGN PATENT DOCUMENTS

| | | |
|---|---|---|
| JP | 2001-123136 | 5/2001 |
| WO | 2012-024354 | 2/2012 |
| WO | 2013-173976 | 11/2013 |
| WO | 2016-036701 | 3/2016 |
| WO | 2018-160564 | 9/2018 |

OTHER PUBLICATIONS

ASI adhesives and sealants (Oligomers Sartomer Co. Inc.) adhesivesmag.com (Year: 2003).*
International Search Report for PCT International Application No. PCT/US2018/020082, dated Jun. 1, 2018, 5 pages.

* cited by examiner

*Primary Examiner* — Alicia J Sawdon

(57) ABSTRACT

The present invention is an optically clear, curable adhesive including a polyvinylbutyral, a polyurethane (meth)acrylate, a (meth)acrylate monomer, and a photoinitiator. The polyvinylbutyral has a dynamic viscosity of between about 9 and about 13 mPa·s and a polyvinyl alcohol weight percent of less than about 18%. The polyurethane (meth)acrylate includes the reaction product of a diol, at least one diisocyanate, and a hydroxyfunctional (meth)acrylate or an isocyanatofunctional (meth)acrylate. When the optically clear, curable adhesive is placed between two transparent substrates and made into a laminate, the laminate has a haze of less than about 6%, a transmission of greater than about 88%, and an optical clarity of greater than about 98% when cured. The optically clear, curable adhesive also has a peel adhesion of at least about 100 g/cm based on ASTM 3330 when cured.

20 Claims, No Drawings

HIGH PERFORMANCE PHOTOCURABLE OPTICALLY CLEAR ADHESIVE

FIELD OF THE INVENTION

The present invention is generally related to optically clear adhesives. In particular, the present invention is a photocurable optically clear adhesive.

BACKGROUND

Compared to traditional optically clear adhesive (OCA) films, it is believed that photocurable optically clear adhesives (PCOCAs) can provide thinner gaps, better control over thickness, less to no stress from lamination, and better conformability to the various features of a display assembly, such as ink steps. Therefore, liquid optically clear adhesives (LOCAs) are becoming more prevalent in the display industry to fill the air gap between a cover glass and indium-tin oxide (ITO) touch sensors, between ITO touch sensors and liquid crystal modules, or directly between the cover glass and the liquid crystal module.

The display industry is currently moving toward liquid crystal module (LCM) bonding in which it is believed that a low shrinkage, low modulus material is necessary for optical performance and LCM bonding. Furthermore, it is also critical to ensure that the OCA does not have a deleterious effect on the LCM's appearance (e.g. mura effect, optical defects, etc.), has high adhesion, and is optically reliable under environmental conditions, such as exposure to a temperature of 85° C. or conditions of 65° C./90% RH for an extended period of time.

Current LOCA products are predominantly prepared from acrylic monomers or reactive oligomers based on acrylic monomers. However, these products either have significant shrinkage that may be detrimental for LCM bonding or require further optimizations. Polyacrylate based oligomers with curable functionality are also used in LOCA materials to achieve high adhesion, low shrinkage and low modulus LCM bonding. However, these oligomers often require a relatively high concentration of polar monomers, such as 4-hydroxybutyl acrylate, in order to achieve coatable viscosity and optical reliability under environmental aging conditions, which typically require more than 800 hours of optical stability at 85° C. and 65° C./90% RH. Using high levels of diluent monomers can directly contribute to the shrinkage of the adhesive upon cure and can offset the benefit of using polyacrylate oligomers.

SUMMARY

In one embodiment, the present invention is an optically clear, curable adhesive including a polyvinylbutyral, a polyurethane (meth)acrylate, a (meth)acrylate monomer, and a photoinitiator. The polyvinylbutyral has a dynamic viscosity of between about 9 and about 13 mPa·s and a polyvinyl alcohol weight percent of less than about 18%. The polyurethane (meth)acrylate includes the reaction product of a diol, at least one diisocyanate, and a hydroxyfunctional (meth)acrylate or an isocyanatofunctional (meth)acrylate. When the optically clear, curable adhesive is placed between two transparent substrates and made into a laminate, the laminate has a haze of less than about 6%, a transmission of greater than about 88%, and an optical clarity of greater than about 98% when cured. The optically clear, curable adhesive also has a peel adhesion of at least about 100 g/cm based on ASTM 3330 when cured.

In another embodiment, the present invention is an optically clear laminate including a first substrate, a second substrate, and an optically clear, curable adhesive positioned between the first substrate and the second substrate. The optically clear, curable adhesive includes a polyvinylbutyral, a polyurethane (meth)acrylate, a (meth)acrylate monomer, and a photoinitiator. The polyvinylbutyral has a dynamic viscosity of between about 9 and about 13 mPa·s and a polyvinyl alcohol weight percent of less than about 18%. The polyurethane (meth)acrylate includes the reaction product of a diol, at least one diisocyanate, and a hydroxyfunctional (meth)acrylate or an isocyanatofunctional (meth)acrylate. When the optically clear, curable adhesive is placed between two transparent substrates and made into a laminate, the laminate has a haze of less than about 6%, a transmission of greater than about 88% and an optical clarity of greater than about 98% when cured. The optically clear, curable adhesive also has a peel adhesion of at least about 100 g/cm based on ASTM 3330.

DETAILED DESCRIPTION

The present invention is a high performance, photocurable optically clear adhesive (PCOCA) construction. The PCOCA is a curable, optically clear adhesive with superior optical clarity as well as superior adhesion and may be used, for example, in a display assembly for bonding a substrate to glass. The PCOCA materials are prepared from blends of curable (meth)acrylic and polyurethane (or polyurea) based reactive oligomers.

The PCOCA of the present invention includes a polyvinylbutyral, a polyurethane acrylate, a (meth)acrylate monomer, and a photoinitiator. In one embodiment, the PCOCA includes between about 30% and about 70%, particularly between about 40% and about 60%, and more particularly between about 40% and about 55% by weight polyvinylbutyral (excluding photoinitiator); between about 10% and about 60%, particularly between about 15% and about 40%, and more particularly between about 20% and about 30% by weight polyurethane (meth)acrylate (excluding photoinitiator); and between about 10% and about 60%, particularly between about 15% and about 40%, and more particularly between about 20% and about 30% by weight (meth) acrylate monomer (excluding photoinitiator). In an embodiment, the weight percentages of the polyvinylbutyral, polyurethane (meth)acrylate, and (meth)acrylate monomer in the formulation (excluding photoinitiator) total 100%. In another embodiment, the weight percentages of the polyvinylbutyral, polyurethane (meth)acrylate, and (meth)acrylate monomer in the formulation (excluding photoinitiator) total less than 100% due to the presence of additives in the formulation.

In one embodiment, the polyvinylbutyral has a dynamic viscosity of between about 9 and about 30 mPa·s (as measured according to DIN 53015, 10% solids in solution, in ethanol containing 5% water) with a polyvinyl alcohol weight percent of less than about 21%. In particular, the polyvinylbutyral has a polyvinyl alcohol weight percent of between about 14% and about 21% and a polyvinyl acetate weight percent of between about 1% and about 8%. In one embodiment, the polyvinylbutyral has a weight average molecular weight ($M_w$) of between about 10,000 g/mol and about 25,000 g/mol. Examples of suitable commercially available polyvinylbutyrals include, but are not limited to, Mowital B14S, Mowital B16H, and Mowital 20H, all available from Kuraray America, Inc. located in Houston, Tex.

Polyurethane (meth)acrylates are polyurethane polymers having one or more (meth)acrylate groups attached to the polyurethane polymer. Polyurethanes are polymers that are useful in many applications, such as adhesives. Polyurethanes may be prepared from starting materials that include isocyanato functional group-containing compounds, such as polyisocyanates (preferably diisocyanates) and compounds having a functional group reactive with the isocyanate groups, such as polyols and/or polyamines (preferably diols and/or diamines). In some embodiments, polyurethanes are alternating, block, star block, or segmented copolymers (or combinations thereof). Polyurethanes may also contain other chemical moieties, such as alkyl, aryl, acrylate, ether, ester, and carbonate groups, and mixtures thereof. In one embodiment, the polyurethane (meth)acrylate has a weight average molecular weight (Mw) of between about 2,745 g/mol and about 63,000 g/mol.

Polyurethane (meth)acrylates may have (meth)acrylate functionality at one or more chain ends and at other sites in the polymer chain. As a nonlimiting example, a (meth)acrylate diol (e.g., 2-glyceryl (meth)acrylate) may be used to make a polyurethane (meth)acylate having acrylate groups that are at sites not near the polymer chain ends. In a one embodiment, the polyurethane (meth)acrylate has (meth)acrylate functionality at the chain ends.

Polyurethane (meth)acrylates may contain other functionality (e.g., ether, ester, and/or carbonate functional groups) by selection of the starting materials used to make them. As a nonlimiting example, poly(tetramethylene oxide) may be used to make a polyurethane (meth)acrylate that also comprises ether functional groups. A particularly suitable polyurethane (meth)acrylate comprises urethane, (meth)acrylate, and ether functional groups. Another particularly suitable polyurethane (meth)acrylate comprises urethane, (meth)acrylate, and ester functional groups.

Examples of commercially available suitable polyurethane (meth)acrylates include, but are not limited to: CN978, CN981, and CN991 available from Sartomer Americas located in Exton, Pa. In one embodiment, the polyurethane (meth)acrylate has a polydispersity of between about 1.3 and about 3.0. The polydispersity index is used as a measure of the broadness of a molecular weight distribution of a polymer, and is defined by the ratio of the number average molecular weight:weight average molecular weight. The larger the polydispersity index, the broader the molecular weight distribution of the polymer.

The polyurethane (meth)acrylate of the present invention includes a polyurethane (meth)acrylate comprising the reaction product of a diol, at least one diisocyanate, and a hydroxyfunctional (meth)acrylate or an isocyanatofunctional (meth)acrylate. A (meth)acrylate is defined to be an ester of acrylic or methacrylic acid. The diol(s) and diisocyanate(s) may be present in different ratios, depending at least in part on the molecular weights of the diol(s) and diisocyanate(s) and the desired molecular weight of the resulting polyurethane (meth)acrylate. As is well-known in the art of polyurethane formulation, diols may be selected to provide flexibility and conformability to polyurethane (meth)acrylates and to adhesives comprising polyurethane (meth)acrylates. Diols may also be selected to provide compatibility of polyurethane (meth)acrylates with polyvinylbutyral or other components of an adhesive formulation. Without being bound by theory, compatibility between the polyvinylbutyral and the polyurethane (meth)acrylate materials is thought to be necessary to obtain the desired optical properties in the resulting adhesives.

Diols may also be selected for their ability to contribute properties desired in the resulting adhesive, such as adhesive properties and optical properties. In one embodiment, diols based on poly(tetramethylene oxide) and on polycaprolactone are suitable in the polyurethane (meth)acrylates used in the adhesive formulations of the invention, and diols based on poly(tetramethylene oxide) are particularly suitable in polyurethane (meth)acrylates used in the adhesive formulations of the invention. In one embodiment, the diol may include lower molecular weight diols such as ethylene glycol, or butanediol. In one embodiment, the diol is selected from one of a poly(tetramethylene oxide) diol having a number average molecular weight ($M_n$) of about 2000 g/mol or less, a poly(propylene oxide) diol having a number average molecular weight of about 2000 g/mol or less, and a polycaprolactone diol having a number average molecular weight of about 2000 g/mol or less. An example of a suitable commercially available poly(tetramethylene oxide) diol having a number average molecular weight of about 1000 g/mol includes, but is not limited to, PolyTHF 1000 Polyether, available from BASF Corp. located in Florham Park, N.J.

Diisocyanates may also be selected for their ability to provide properties desired in the polyurethane (meth)acrylate and in the resulting adhesives, such as adhesive properties and optical properties. In one embodiment, the isocyanates include aliphatic isocyanates. Particularly suitable isocyanates include aliphatic diisocyanates. As is known in the art, an aliphatic isocyanate is one in which each of the one or more isocyanato group(s) is attached by a chemical bond to an aliphatic carbon atom. However, it is acceptable that an aliphatic isocyanate molecule may also contain an aromatic moiety that is not attached to any of the one or more isocyanato groups. By this definition, methylene diphenyl diisocyanate (MDI) and toluene diisocyanate (TDI) are not aliphatic isocyanates, but are considered to be aromatic isocyanates. However, meta-tetramethylxylylene diisocyanate and para-tetramethylxylylene diisocyanate (m-TMXDI and p-TMXDI, respectively) are considered aliphatic isocyanates even though they contain an aromatic ring (see structures below). Of course, isocyanates containing no aromatic moiety in their molecular structure, such as isophorone diisocyanate (IPDI), are aliphatic isocyanates.

Aromatic isocyanates

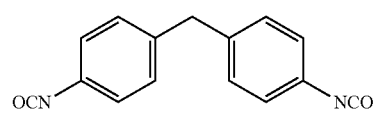

Methylene diphenyl diisocyanate (MDI)

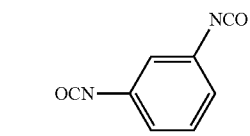

Toluene diisocyanate (TDI)

-continued

Aliphatic isocyanates

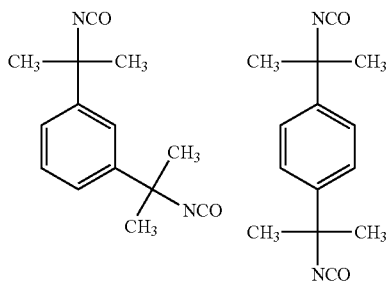

m-TMXDI and p-TMXDI

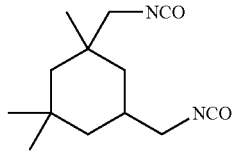

Isophorone diisocyanate (IPDI)

Examples of suitable diisocyanates include, but are not limited to: 2,6-toluene diisocyanate (TDI), methylenedicyclohexylene-4,4'-diisocyanate (H12MDI), 3-isocyanatomethyl-3,5,5-trimethylcyclohexyl isocyanate (IPDI), 1,6-diisocyanatohexane (HDI), tetramethyl-m-xylylene diisocyanate, a mixture of 2,2,4- and 2,4,4-Trimethyl-1,6-diisocyanatohexane (TMXDI), trans-1,4-hydrogenated xylylene diisocyanates (H6XDI) and combinations thereof. In one embodiment, the diisocyanate is an aliphatic diisocyanate.

The polyurethane (meth)acrylate of the present invention may also include a hydroxyfunctional (meth)acrylate or an isocyanatofunctional (meth)acrylate. Monofunctional molecules may also be used in the preparation of polyurethanes. For example, monofunctional molecules such as monofunctional alcohol- and isocyanate-containing molecules can be used to introduce functional groups at or near the polyurethane chain ends during polymer synthesis. Suitable monofunctional alcohols include 2-hydroxyethyl acrylate (HEA) and 2-hydroxyethyl methacrylate (HEMA). Another monofunctional alcohol providing more than one acrylate per alcohol group is exemplified by glycerol dimethacrylate, also known as bis(methacryloyloxy)propanol (mixture of 1,2- and 1,3-form), Suitable monofunctional isocyanates include 2-isocyanatoethyl acrylate and 2-isocyanatoethyl methacrylate. Another monofunctional isocyanate providing more than one acrylate per isocyanate group is exemplified by. 1,1-bis(acryloyloxymethyl)ethyl isocyanate, available from CBC America, Commack, N.Y. All of these compounds may be used to synthesize polyurethanes with (meth)acrylate end groups.

Suitable polyurethane (meth)acrylates are prepared by combining a monofunctional alcohol and a difunctional alcohol with a diisocyanate. In one embodiment, the monofunctional alcohol is selected from HEA, HEMA, and combinations thereof. Other suitable polyurethanes are prepared by combining a monofunctional isocyanate and a difunctional isocyanate with a diol. In one embodiment, the monofunctional isocyanate is selected from 2-isocyanatoethyl acrylate, 2-isocyanatoethyl methacrylate. In another embodiment, polyurethane (meth)acrylates are prepared by combining a monofunctional alcohol, as discussed above, with a diisocyanate. Another example of a monofunctional alcohol suitable for reaction with a diisocyanate is caprolactone extended hydroxyethyl (meth)acrylate. An example of a commercially suitable caprolactone extended hydroxyethyl (meth)acrylate includes, but is not limited to, SR495, available from Sartomer Americas located in Exton, Pa.

A variety of methods may be used to synthesize polyurethane (meth)acrylates. The starting materials may be combined by methods known in the art and in selected ratios to produce polyurethane (meth)acrylates with desired properties, such as a selected molecular weight. One method known in the art is to combine a polyfunctional alcohol (preferably a diol) with a polyisocyanate (preferably a diisocyanate) to produce a polyurethane prepolymer. A polyurethane prepolymer may have either alcohol or isocyanate functional groups on the molecular chain ends, depending on the selected ratio of polyalcohol to polyisocyanate.

In an embodiment in which a polyurethane prepolymer is synthesized by reaction of a diol and a diisocyanate, the ratio of diisocyanate to diol is chosen to both provide the desired molecular weight and to produce either isocyanate or hydroxyl end groups at the ends of the polyurethane prepolymer. A polyurethane prepolymer with isocyanate functional groups on the molecular chain ends can be reacted with a monoalcohol to produce a polyurethane in which the end groups are provided by the monoalcohol. A polyurethane prepolymer with alcohol functional groups on the molecular chain ends can be reacted with a monoisocyanate to produce a polyurethane in which the end groups are provided by the monoisocyanate.

In one embodiment, a polyurethane prepolymer is reacted with another molecule that introduces (meth)acrylate functionality. The meth(acrylate) molecule is chosen to have functionality that is complementary to that of the polyurethane prepolymer that it is reacted with. For example, for an isocyanate-terminated polyurethane prepolymer, a (meth)acrylate molecule is chosen that also contains hydroxyl functionality (for example, HEA or HEMA). Alternatively, for a hydroxyl-terminated polyurethane prepolymer, a (meth)acrylate molecule is chosen that also contains an isocyanate group (for example, 2-isocyanatoethyl acrylate or 2-isocyanatoethyl methacrylate). These polyurethane polymers with (meth)acrylate end groups are referred to as polyurethane (meth)acrylates or urethane (meth)acrylates.

The polyisocyanate and the polyfunctional alcohol may be chosen to provide properties desired in the resulting polyurethane (meth)acrylate, such as thermal properties (e.g., glass transition temperature), optical properties (e.g., transmission, haze, and clarity), solubility in selected solvents, and compatibility with other selected polymers (e.g., poly(vinyl butyral) (PVB)).

Polyurethane (meth)acrylates may have (meth)acrylate functionality at one or more chain ends and at other sites in the polymer chain. As a nonlimiting example, a (meth)acrylate diol (e.g., 2-glyceryl (meth)acrylate) may be used to make a polyurethane (meth)acrylate having (meth)acrylate groups that are at sites not near the polymer chain ends. In a preferred embodiment, a polyurethane (meth)acrylate has (meth)acrylate functionality at the chain ends.

Polyurethane (meth)acrylates may contain other functionality (e.g., ether, ester, and/or carbonate functional groups) by selection of the starting materials used to make them. As a nonlimiting example, poly(tetramethylene oxide) may be used to make a polyurethane (meth)acrylate that also comprises ether functional groups. A particularly suitable polyurethane (meth)acrylate comprises urethane, (meth)acrylate, and ether functional groups. Another particularly suitable polyurethane (meth)acrylate comprises urethane, (meth) acrylate, and ester functional groups.

In one embodiment, the (meth)acrylate monomer includes at least one of monofunctional or difunctional acrylates. These (meth)acrylates can provide increased adhesion while maintaining the optical properties of the adhesive formulations in which they are used. Examples of suitable (meth) acrylate monomers include, but are not limited to: cyclohexane 1,4-dimethanol diacrylate; monofunctional methoxylated polyethylene glycol 550 acrylate monomer; ethoxylated 1,6-hexanediol diacrylate; alkoxylated lauryl acrylate; 2-[[butylamino)carbonyl]oxy]ethyl acrylate; 1,6 hexanediol diacrylate; tetrahydrofufuryl acrylate; phenoxyethyl acrylate; ethoxylated nonylphenol acrylate; and ethoxylated phenoxyethyl acrylate. Examples of suitable commercially available (meth)acrylate monomers include, but are not limited to: CD406, CD553, CD561, CD9075, CN3100, SR238, SR285, SR339, SR504, SR9050 and SR9087, available from Sartomer Americas located in Exton, Pa., and Genomer 1122 and, available from Rahn-Group located in Aurora, Ill.

A photoinitiator is used to cure the PCOCA. Typically, the initiator or initiators are activated by exposure to light of the appropriate wavelength and intensity. Often UV light is used. Examples of suitable commercially available photoinitators include, but are not limited to: Darocur 4265 and Irgacure 184, both available from BASF Corp. located in Florham Park, N.J.

In one embodiment, the PCOCA optionally includes a hydroxyfunctional monomer with an aromatic moiety, such as the epoxy acrylate:

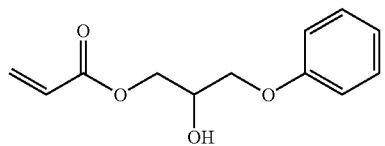 [SMILES: C=CC(=O)OCC(O)COc1ccccc1]

which constitutes the majority of the material in commercially available Sartomer CN3100, available from Sartomer Americas located in Exton, Pa.

Other materials can be added to the precursor mixture for special purposes, including, for example: heat stabilizers, adhesion promoters, crosslinking agents, surface modifying agents, ultraviolet light stabilizers, antioxidants, antistatic agents, thickeners, fillers, pigments, colorants, dyes, thixotropic agents, processing aids, nanoparticles, fibers and combinations thereof.

In practice, the high performance, photocurable optically clear adhesive can be positioned between a first substrate and a second substrate to form a laminate. The laminate includes the first substrate having at least one major surface, the second substrate having at least one major surface and the PCOCA positioned adjacent the major surfaces of the first and second substrates. Thus, at least one of the first and second substrates is optically clear and may include, for example, an optical film or optically clear substrate.

The laminate including the PCOCA can be used in a display assembly. The display assembly can further include another substrate (e.g., permanently or temporarily attached to the PCOCA), another adhesive layer, or a combination thereof. As used herein, the term "adjacent" can be used to refer to two layers that are in direct contact or that are separated by one or more thin layers, such as primer or hard coating. Often, adjacent layers are in direct contact. Additionally, laminates are provided that include the PCOCA positioned between two substrates, wherein at least one of the substrates is an optical film. Optical films intentionally enhance, manipulate, control, maintain, transmit, reflect, refract, absorb, retard, or otherwise alter light that impinges upon a surface of the film. Films included in the laminates include classes of material that have optical functions, such as polarizers, interference polarizers, reflective polarizers, diffusers, colored optical films, mirrors, louvered optical film, light control films, transparent sheets, brightness enhancement film, anti-glare, and anti-reflective films, and the like. Films for the provided laminates can also include retarder plates such as quarter-wave and half-wave phase retardation optical elements. Other optically clear films include anti-splinter films and electromagnetic interference filters.

In some embodiments, the resulting laminates can be optical elements or can be used to prepare optical elements. As used herein, the term "optical element" refers to an article that has an optical effect or optical application. The optical elements can be used, for example, in electronic displays, architectural applications, transportation applications, projection applications, photonics applications, and graphics applications. Suitable optical elements include, but are not limited to, glazing (e.g., windows and windshields), screens or displays, cathode ray tubes, and reflectors.

Exemplary optically clear substrates include, but are not limited to: a display panel, such as liquid crystal display, an OLED display, a touch panel or a cathode ray tube, a window or glazing, an optical component such as a reflector, polarizer, diffraction grating, mirror, or cover lens, another film such as a decorative film or another optical film.

Representative examples of optically clear substrates include glass and polymeric substrates including those that contain polycarbonates, polyesters (e.g., polyethylene terephthalates and polyethylene naphthalates), polyurethanes, poly(meth)acrylates (e.g., polymethyl methacrylates), polyvinyl alcohols, polyolefins such as polyethylenes, polypropylenes, and cellulose triacetates. Typically, cover lenses can be made of glass, polymethyl methacrylates, or polycarbonate.

In other embodiments, either substrate can be a release liner. Any suitable release liner can be used. Exemplary release liners include those prepared from paper (e.g., Kraft paper) or polymeric material (e.g., polyolefins such as polyethylene or polypropylene, ethylene vinyl acetate, polyurethanes, polyesters such as polyethylene terephthalate, and the like). At least some release liners are coated with a layer of a release agent such as a silicone-containing material or a fluorocarbon-containing material. Exemplary release liners include, but are not limited to, liners commercially available from CP Film (Martinsville, Va.) under the trade designation "T-30" and "T-10" that have a silicone release coating on polyethylene terephthalate film.

The release liner can be removed to adhere the PCOCA to another substrate (i.e., removal of the release liner exposes a surface of an adhesive layer that subsequently can be bonded to another substrate surface). Often, the PCOCA is permanently bonded to this other substrate, although in some cases the adhesion may be limited to allow for reworking of the display.

The high performance, photocurable optically clear adhesive of the present invention maintains optical clarity, bond strength, and resistance to delamination over the lifetime of the article in which it is used. As used herein, the term "optically clear" refers to a material that has a haze of less than about 6%, particularly less than about 4% and more particularly less than about 2%; a luminous transmission of greater than about 88%, particularly greater than about 89%, and more particularly greater than about 90%; and an optical clarity of greater than about 98%, particularly greater than about 99%, and more particularly greater than about 99.5% when cured. Typically, the clarity, haze, and transmission are measured on a construction in which the adhesive is held between two optical films, such as poly(ethylene terephthalate) (PET). The measurement is then taken on the entire construction, including the adhesive and the substrates. Both the haze and the luminous transmission can be determined using, for example, ASTM-D 1003-92. The optical measurements of transmission, haze, and optical clarity can be made using, for example, a BYK Gardner haze-gard plus 4725 instrument (Geretsried, Germany). The BYK instrument uses an illuminant "C" source and measures all the light over that spectral range to calculate a transmission value. Haze is the percentage of transmitted light that deviates from the incident beam by more than 2.5°. Optical clarity is evaluated at angles of less than 2.5°. Typically, the PCOCA is visually free of bubbles.

The high performance, photocurable optically clear adhesive of the present invention also has a peel adhesion of at least about 100 g/cm, particularly at least about 150 g/cm and more particularly at least about 200 g/cm based on ASTM 3330 when cured. If the peel adhesion of the PCOCA is too low, the adhesive will fail and may cause an article including it to come apart (delaminate). An adhesive may fail in a number of ways. The adhesive fails if adhesive residue remains on either one or both substrates positioned adjacent either side of the adhesive.

The PCOCAs of the present invention offer several advantages over polyvinylbutyrals when used to make devices. The PCOCAs are curable, so they can have markedly different properties before and after cure. Polyvinylbutyrals do not change properties in this manner, and therefore behave more like hot melt adhesives. Also, because they are cured, the PCOCAs resist flow. Polyvinylbutyrals are known to flow at elevated temperatures, such as those an adhesive could be exposed to during the manufacture of a device. Furthermore, because they are a mixture of components, the properties of PCOCAs can be tuned to meet product needs by the choice of components and by varying the ratio of components. This provides advantages in the sourcing, development, and application of PCOCAs for new products over both the polyvinylbutyrals by themselves and over many existing optically clear adhesives.

The laminates of the present invention have at least one of the following properties: the PCOCA has optical transmissivity over a useful lifetime of the article, the PCOCA can maintain a sufficient bond strength between layers of the article, the PCOCA can resist or avoid delamination, and the PCOCA can resist bubbling of the adhesive layer over a useful lifetime. When used in an optical display, the laminate is optically clear, having a haze of less than about 6%, particularly less than about 4% and more particularly less than about 2%; a luminous transmission of greater than about 88%, particularly greater than about 89%, and more particularly greater than about 90%; and an optical clarity of greater than about 98%, particularly greater than about 99%, and more particularly greater than about 99.5% when cured.

Objects and advantages of this disclosure are further illustrated by the following examples, but the particular materials and amounts thereof recited in these examples, as well as other conditions and details, should not be construed to unduly limit this invention.

EXAMPLES

The present invention is more particularly described in the following examples that are intended as illustrations only, since numerous modifications and variations within the scope of the present invention will be apparent to those skilled in the art. Unless otherwise noted, all parts, percentages, and ratios reported in the following examples are on a weight basis.

TABLE 1

Materials

| Trade name or abbreviation | Description | Source |
|---|---|---|
| Mowital B 14 S (B 14 S in Table 3) | Poly(vinyl butyral) (PVB), Average MW 13,000 g/mol, 14-18% poly(vinyl alcohol) | Kuraray America, Inc., Houston, TX |
| Mowital B 16 H (B 16 H in Table 3) | Poly(vinyl butyral) (PVB), Average MW 15,000 g/mol, 18-21% poly(vinyl alcohol) in PVB | Kuraray America, Inc., Houston, TX |
| Pioloform BL 16 H (BL 16 H in Table 3) | Poly(vinyl butyral),Poly(vinyl formal), Average MW 23,000 g/mol, 14-18% poly(vinyl alcohol) | Kuraray America, Inc., Houston, TX |
| Mowital B 20 H (B 20 H in Table 3) | Poly(vinyl butyral) (PVB), Average $M_W$ 23,000 g/mol, 18-21% poly(vinyl alcohol) in PVB | Kuraray America, Inc., Houston, TX |
| Mowital B 30 H (B 30 H in Table 3) | Poly(vinyl butyral) (PVB), Average $M_W$ 33,000 g/mol, 18-21% poly(vinyl alcohol) in PVB | Kuraray America, Inc., Houston, TX |
| Mowital B 60 H (B 60 T in Table 3) | Poly(vinyl butyral) (PVB), Average $M_W$ 55,000 g/mol, 18-2127% poly(vinyl alcohol) in PVB | Kuraray America, Inc., Houston, TX |
| Butvar B-76 (B-76 in Table 3) | Poly(vinyl butyral) (PVB), $M_W$ 90,000-120,000 g/mol, 11.5-13.5% poly(vinyl alcohol) in PVB | Solutia Inc., St Louis, MO |
| Butvar B-79 (B-79 in Table 3) | Poly(vinyl butyral) (PVB), $M_W$ 50,000-80,000 g/mol, 11.5-13.5% poly(vinyl alcohol) in PVB | Solutia Inc., St Louis, MO |
| Butvar B-98 (B-98 in Table 3) | Poly(vinyl butyral) (PVB), $M_W$ 40,000-70,000 g/mol, 18-20% poly(vinyl alcohol) in PVB | Solutia Inc., St Louis, MO |
| Voranol 200-56 | Poly(propylene oxide), ~$M_W$ 2,000 g/mol | Dow Chemical Co., Midland, MI |
| PolyTHF 1000 Polyether | Poly(tetramethylene oxide) (PTMO), ~$M_W$ 1,000 g/mol | BASF Corp., Florham Park, NJ |
| PolyTHF 2000 Polyether | Poly(tetramethylene oxide) (PTMO), ~$M_W$ 2,000 g/mol | BASF Corp., Florham Park, NJ |
| Terethane 650 | Poly(tetramethylene oxide) (PTMO), ~$M_W$ 650 g/mol | Invista, Wichita, KS |
| Terethane 250 | Poly(tetramethylene oxide) (PTMO), ~$M_W$ 250 g/mol | Invista, Wichita, KS |
| Fomrez 55-112 | Poly(neopentyl adipate) glycol, $M_W$ 1,000 g/mol | Chemtura, Middlebury, CT |
| Capa 2100 | Poly(polycaprolactone) glycol polyester polyol, $M_W$ 1,000 g/mol | Perstorp, Toledo, OH |

TABLE 1-continued

Materials

| Trade name or abbreviation | Description | Source |
|---|---|---|
| C-1090 | Polycarbonate diol, ~$M_W$ 1,000 g/mol | Kuraray, Houston, TX |
| Desmodur I (IPDI) | Isophorone diisocyanate | Bayer Corp., Pittsburgh, PA |
| Desmodur W (H12MDI) | 4,4'-Methylene dicyclohexyl diisocyanate | Bayer Corp., Pittsburgh, PA |
| HEA | 2-Hydroxyethyl acrylate | Sigma-Aldrich, Milwaukee, WI |
| CN978 | Aromatic polyether based polyurethane diacrylate | Sartomer Americas, Exton, PA |
| CN964 | Aliphatic polyester-based polyurethane diacrylate | Sartomer Americas, Exton, PA |
| CN3100 | Low viscosity aromatic acrylic oligomer with hydroxyl functionality is believed to comprised mainly of 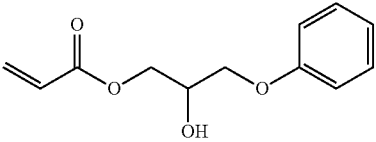 [SMILES: C=CC(=O)OCC(O)COc1ccccc1] | Sartomer Americas, Exton, PA |
| Darocur 4265 | Photoinitiator | BASF Corp., Florham Park, NJ |
| DBTDL | Dibutyltin dilaurate | Sigma-Aldrich, Milwaukee, WI |
| MEK | Methyl ethyl ketone | Avantor Performance Materials, Center Valley, PA |
| PET | Poly(ethylene terephthalate) 5 mil Dupont Teijin Films Melinex™ 618 polyester | Professional Plastics, Denver, CO |
| SKC T50 tight release liner | Poly(ethylene terephthalate) silicone coated release liner-2 mil | SKC, Seoul, KR |
| SH81 PET | Skyrol SH81 2 mil primed polyester | SKC, Seoul, KR |
| Plasma primed PET | 2 mil PET, plasma treated as described below | 3M, St. Paul, MN |
| SR495 | Caprolactone monofunctional acrylate | Sartomer Americas, Exton, PA |
| Vestanat TMDI | Mixture of 2,2,4-trimethyl-1,6-diisocyanatohexane and 2,4,4-trimethyl-1,6-diisocyanatohexane | Evonik, Parsippany, NJ |
| HDI | 1,6-diisocyanatohexane | Alfa Aesar, Ward Hill, MA |
| H6XDI | 1,3-bis(isocyanatomethyl)cyclohexane | Aldrich, Milwaukee, WI |
| TMXDI | Tetramethyl xylylene diisocyanate | Aldrich, Milwaukee, WI |
| CD553 | Monofunctional methoxylated PEG 550 acrylate monomer | Sartomer Americas, Exton, PA |
| SR504 | Ethoxylated nonylphenol acrylate | Sartomer Americas, Exton, PA |
| SR9050 | Believed to be a mixture of methacrylate phosphoric acid ester and 2-(2-Ethoxyethoxy)ethyl acrylate | Sartomer Americas, Exton, PA |
| SR256 | 2-(2-Ethoxyethoxy)ethyl acrylate | Sartomer Americas, Exton, PA |
| SR339 | Phenoxyethyl acrylate | Sartomer Americas, Exton, PA |
| SR9087 | Ethoxylated phenoxyethyl acrylate | Sartomer Americas, Exton, PA |
| SR506 | Isobornyl acrylate | Sartomer Americas, Exton, PA |
| CD9075 | Alkoxylated lauryl acrylate | Sartomer Americas, Exton, PA |
| SR335 | Lauryl acrylate | Sartomer Americas, Exton, PA |
| SR285 | Tetrahydrofufuryl acrylate | Sartomer Americas, Exton, PA |
| SR611 | Alkoxylated tetrahydrofufuryl acrylate | Sartomer Americas, Exton, PA |
| Genomer 1122 | monofunctional urethane acrylate CAS registry number 63225-53-6 | Rahn, USA, Aurora, IL |
| CD406 | Cyclohexane 1,4-dimethanol diacrylate | Sartomer Americas, Exton, PA |
| SR238 | 1,6 hexanediol diacrylate | Sartomer Americas, Exton, PA |
| CD561 | Ethoxylated 1,6 hexanediol diacrylate | Sartomer Americas, Exton, PA |
| CN981 | Is believed to be IPDI-ethylene glycol-caprolactone acrylated polyurethane and hexane diol diacrylate | Sartomer Americas, Exton, PA |
| CN991 | Is believed to be H12MDI capped with SR495 | Sartomer Americas, Exton, PA |
| CN9002 | Aliphatic polyurethane diacrylate (lower viscosity) | Sartomer Americas, Exton, PA |
| CN9004 | Aliphatic polyurethane diacrylate (higher viscosity) | Sartomer Americas, Exton, PA |
| IEA | Isocyanatoethyl acrylate | CBC America Corp., Commack, NY |

Test Methods

180° Peel Adhesion Test

The peel adhesion test was based on ASTM D 3330. Room temperature peels were done using an IMASS peel tester, available from IMASS, Inc. (Accord, Mass.) using a 5 kg load cell, a 4 second delay, a 20 second test time and a 30.48 cm/min peel rate. Three replicates were tested and the averages are reported in grams per centimeter (g/cm).

Luminous Transmission, Clarity, and Haze

The optical measurements of transmission, haze, and optical clarity were made using a BYK Gardner haze-gard plus 4725 instrument (Geretsried, Germany). The BYK instrument uses an illuminant "C" source and measures all the light over that spectral range to calculate a transmission value. Haze is the percentage of transmitted light that deviates from the incident beam by more than 2.5°. Optical clarity is evaluated at angles of less than 2.5°. Values are reported as percent transmission (% T), percent haze (% H), and percent clarity (% C) in Table 3. A sample was considered acceptable if it had transmission of at least 88%, a percent haze of no more than 6%, and a percent clarity at least 98% after rounding.

Molecular Weight Determination

The molecular weight distribution of each polyurethane acrylate was characterized using conventional gel permeation chromatography (GPC). The GPC instrumentation, which was obtained from Waters Corporation (Milford, Mass., USA), included a high pressure liquid chromatography pump (Model 1515HPLC), an auto-sampler (Model 717), a UV detector (Model 2487), and a refractive index detector (Model 2410). The chromatograph was equipped with two 5 micron PLgel MIXED-D columns, available from Varian Inc. (Palo Alto, Calif., USA). Samples of polymeric solutions were prepared by diluting polymer solution or dissolving dried polymer materials in tetrahydrofuran (THF) at a concentration of 0.5 percent (weight/volume) and filtering the THF solution through a 0.2 micron polytetrafluoroethylene filter that is available from VWR International (West Chester, Pa., USA). The resulting samples were injected into the GPC and eluted at a rate of 1 milliliter per minute through the columns maintained at 35° C. The system was calibrated with polystyrene standards using a linear least squares fit analysis to establish a calibration curve. The weight average molecular weight ($M_w$) and the polydispersity index (weight average molecular weight divided by number average molecular weight) were calculated for each sample against this standard calibration curve.

Sample Preparation

Plasma Primed PET

A roll of 125 micron thick polyethylene phthalate (PET) film was mounted on the unwind-roll of a roll-to-roll vacuum processing chamber, the film wrapped around a drum electrode, and then secured to the take-up roll on the opposite side of the drum electrode. The un-wind and take-up tensions were maintained at 3 pounds (13.3 N). The chamber door was closed and the chamber pumped down to a base pressure of about 5×10-4 Torr. Hexamethyldisiloxane (HMDSO) was introduced at a flow rate of 20 standard cubic centimeters per minute (sccm), and oxygen was provided at a flow rate of 500 sccm. Plasma was turned on at a power of 6000 watts by applying radio frequency power to the drum and the drum rotation initiated so that the film was transported at a speed of 10 feet per minute. The pressure during the exposure was around 8-10 mTorr.

Peel Test Sample Preparation

Adhesive solutions as provided in Table 3 were coated on the primed surface of plasma primed PET using a knife coater with a 20 mil gap. The coated samples were dried at 70° C. for ten minutes. The samples were removed from the oven and an SKC T50 tight release liner was applied by hand. The samples were then cut to 1.3 cm width by 13 cm length. Float glass panes of dimensions 6.35 cm by 17.78 cm were heated to 90° C. in an oven before lamination. The release liner was then removed from the samples and they were laminated to the air side (non-tin) of float glass using a hand roller. The laminated glass slides were then placed in an oven at 90° C. for 5 minutes before laminating again, using release liner film as an interface between the roller and the samples, to prevent contaminating the roller in case the adhesive oozed. The coating was then cured using a Light-Hammer 6 UV curing system (Fusion UV-Systems Inc., Gaithersburg, Md.) equipped with a D bulb operating under nitrogen atmosphere at 100% lamp power at a line speed of 20 feet/min using 4 passes.

Preparation of Polyurethane Acrylate C (16 IPDI 14 PTMO 1000 2 HEA)

A three liter three-necked round-bottomed reaction flask equipped with an overhead stirrer was charged with 99.31 g (0.8935 equivalents (eq.), 111.15 eq Wt) IPDI, 480 g MEK, 386.42 g (0.7818 eq, 492.27 eq Wt) PolyTHF 1000 (dried overnight at 80° C. at a pressure of less than 20 mmHg) and 0.25 g (500 ppm with respect to total solids) DBTDL. The flask was placed in an oil bath, fitted with a condenser and a temperature probe, placed under dry air, and allowed to stir. At the beginning, the reaction temperature was 28° C., at 5 min it was 29.9° C., at 13 min it was 31.7° C., at 23 min it was 47.9° C., and at 31 min it was 53° C. At this time the oil bath was heated to bring the internal temperature to 60° C. At 4 h and 15 min after the start of the reaction, an FTIR of a reaction aliquot showed a small isocyanate peak at 2265 cm-1. At 4 h 20 min after the start of the reaction, 14.23 g (0.1229 eq, 10% stoichiometric excess) HEA was added and rinsed in with 20 g MEK to bring the reaction to 50% solids. At 6 h 20 min after the start of the reaction, FTIR of a reaction aliquot showed no isocyanate peak at 2265 cm-1. The reaction was then adjusted to 35% solids with 428.57 g MEK. The structures of these polyurethane acrylates are believed to be linear polymers formed by reaction of the diols and diisocyanates to form polyurethanes, and these linear polymers are capped on each end with hydroxyethyl acrylate (two equivalents required, but 10% stoichiometric excess was used to ensure complete conversion). The stoichiometric amount of HEA would be 0.1229/1.1 or 0.1117 eq. The number of equivalents of IPDI was (0.8935/0.1117)*2, or 16 equivalents, and the number of equivalents of the PTMO diol was (0.7818/0.1117)*2, or 14 equivalents.

General Procedure for the Preparation of Polyurethane Acrylates

The procedure described above for polyurethane acrylate C was used to synthesize the remaining polyurethane acrylates (PUA), using the starting material weights in grams as indicated in Table 2. The reactions were run in either a flask or a jar (with magnetic stirring) at 50% solids with 500 ppm DBTDL. All polyols were dried under vacuum (<10 torr) at 80° C. for at least two hours before use. In some cases, some reactions were diluted to 35% or 33% solids, and in some cases the reaction was left at 50% solids (indicated in Table 2) and used in further formulations.

TABLE 2

Starting materials, percent solids of final material, and molecular weight and polydispersity for polyurethane acrylates

| PUA | Equivalent Ratios of Starting Materials | Grams Solids Used in Formulation | Final wt % Solids in MEK | Molecular Weight Measured by GPC (grams per mole) | Polydispersity |
|---|---|---|---|---|---|
| A | 20 IPDI | 15 | 50 | 17200 | 2.61 |
|   | 18 Polypropyleneoxide diol (2000 g/mol) | 121.46 |  |  |  |
|   | 2 HEA | 1.57 |  |  |  |
| B | 10 IPDI | 14.35 | 50 | 15118 | 2.72 |
|   | 8 PolyTHF 1000 | 51.64 |  |  |  |
|   | 2 HEA | 3.00 |  |  |  |

TABLE 2-continued

Starting materials, percent solids of final material, and molecular weight and polydispersity for polyurethane acrylates

| PUA | Equivalent Ratios of Starting Materials | Grams Solids Used in Formulation | Final wt % Solids in MEK | Molecular Weight Measured by GPC (grams per mole) | Polydispersity |
|---|---|---|---|---|---|
| C | 16 IPDI | 99.31 | 35 | 20482 | 2.65 |
|   | 14 PolyTHF 1000 | 386.42 | | | |
|   | 2 HEA | 14.23 | | | |
| D | 18 IPDI | 21.69 | 50 | 35120 | 2.62 |
|   | 8 PolyTHF 1000 | 42.74 | | | |
|   | 8 PolyTHF 2000 | 85.45 | | | |
|   | 2 HEA | 2.83 | | | |
| E | 16 IPDI | 15.33 | 50 | NA | NA |
|   | 14 PolyTHF 2000 | 120.69 | | | |
|   | 2 HEA | 2 | | | |
| F | 16 H12MDI | 28.12 | 33.3 | 23455 | 1.39 |
|   | 14 PolyTHF 1000 | 93.77 | | | |
|   | 2 HEA | 3.11 | | | |
| G | 16 IPDI | 25 | 50 | 18600 | 2.82 |
|   | 14 Fomrez 55-112 | 98.40 | | | |
|   | 2 HEA | 3.26 | | | |
| H | 16 IPDI | 100 | 50 | 21800 | 2.71 |
|   | 14 CAPA 2100 (1000 g/mol polycaprolactonediol) | 393.61 | | | |
|   | 2 HEA | 13.06 | | | |
| I | 16 IPDI | 12.5 | 50 | 21198 | 2.53 |
|   | 14 Kuraray C-1090 | 49.55 | | | |
|   | 2 HEA | 1.63 | | | |
| J | 16 TMDI | 7.6 | 35 | 45416 | 1.82 |
|   | 14 PolyTHF 1000 | 31.3 | | | |
|   | 2 HEA | 1.16 | | | |
| K | 16 HDI | 6.33 | 35 | 31327 | 1.73 |
|   | 14 PolyTHF 1000 | 32.53 | | | |
|   | 2 HEA | 1.2 | | | |
| L | 16 H6XDI | 7.13 | 35 | 33455 | 1.64 |
|   | 14 PolyTHF 1000 | 31.75 | | | |
|   | 2 HEA | 1.17 | | | |
| M | 16 TMXDI | 8.57 | 35 | 31270 | 1.72 |
|   | 14 PolyTHF 1000 | 30.36 | | | |
|   | 2 HEA | 1.12 | | | |
| N | 24 IPDI | 9.68 | 50 | 62917 | 1.65 |
|   | 22 PolyTHF 1000 | 39.44 | | | |
|   | 2 HEA | 0.88 | | | |
| O | 12 IPDI | 10.23 | 50 | 17717 | 1.94 |
|   | 10 PolyTHF 1000 | 37.90 | | | |
|   | 2 HEA | 1.87 | | | |
| P | 14 IPDI | 10.06 | 50 | 23545 | 1.89 |
|   | 12 PolyTHF 1000 | 38.36 | | | |
|   | 2 HEA | 1.58 | | | |
| Q | 8 IPDI | 4.88 | 50 | 30870 | 1.83 |
|   | 8 H12MDI | 5.76 | | | |
|   | 14 PolyTHF 1000 | 38.01 | | | |
|   | 2 HEA | 1.34 | | | |
| R | 8 IPDI | 10.82 | 35 | 7449 | 2.25 |
|   | 6 PolyTHF 1000 | 36.08 | | | |
|   | 2 HEA | 3.11 | | | |
| S | 6 IPDI | 11.50 | 35 | 4401 | 2.09 |
|   | 4 PolyTHF 1000 | 34.09 | | | |
|   | 2 HEA | 4.41 | | | |
| T | 4 IPDI | 13.16 | 35 | 2745 | 1.77 |
|   | 2 PolyTHF 1000 | 29.27 | | | |
|   | 2 HEA | 7.56 | | | |
| U | 16 IPDI | 13.51 | 35 | 35491 | 2.13 |
|   | 14 PolyTHF 650 | 34.55 | | | |
|   | 2 HEA | 1.94 | | | |
| V | 16 IPDI | 23.50 | 35 | 7750 | 1.95 |
|   | 14 PolyTHF 250 | 23.12 | | | |
|   | 2 HEA | 3.38 | | | |

Prophetic Example—Preparation of a Polyurethane Acrylate Using a Hydroxyl-Terminated Prepolymer A 500 mL three-necked round-bottomed reaction flask equipped with an overhead stirrer is charged with 27.25 g (0.245 equivalents (eq.)) isophorone diisocyanate (IPDI) and 20 g methyl ethyl ketone (MEK), placed in an oil bath, fitted with a condenser, placed under dry air, and heated to 60° C. A pressure equalizing addition funnel is charged with 140.1 g (0.280 eq.) of 1,000 g/mol poly(tetramethylene oxide) (PTMO, dried under vacuum (<10 torr) at 80° C. for at least two hours before use) and 80 g MEK and attached to the reaction flask. To the reaction flask is added 800 microliters of a 10% solution of DBTDL in MEK. The contents of the addition funnel are then added over 30 minutes to the reaction flask, and at the end of that time, the addition funnel is rinsed with 5 g MEK, and 30 g more MEK is added directly to the reaction mixture. At 2 hours into the reaction, the reaction mixture shows a small isocyanate peak at 2265 cm-1 by FTIR. In one portion, 4.94 g (0.0350 eq.) 2-isocyanatoethyl acrylate (HEA) in 8.02 g MEK is added to the reaction from a jar. The jar is rinsed with 5 g and then 0.5 g MEK and the rinses are added to the reaction. After about six hours, 0.10 g 2-isocyanatoethyl acrylate in 5 g of MEK is added to the reaction from a jar. The jar is rinsed with 10 g MEK and the rinse is added to the reaction. The mixture is allowed to react an additional 30 minutes. The product mixture is then adjusted to 50% solids by blowing dry air into the reaction flask to evaporate some of the MEK and the product mixture is then bottled.

General Coating and Curing Procedure for Preparing Samples for Optical Testing

Table 3 provides the composition of the solutions coated for each example. The abbreviations in the column labelled PVB are provided in Table 1. The polyurethane acrylate (PUA) is either described in Table 2 and added at the wt % solids indicated in Table 2, or, for the commercially available polyurethane acrylates (CN964, CN978, CN981, CN991, CN9002, and CN9004), added at 50% solids solutions in MEK, unless otherwise noted. The photoinitiator solution is Irgacure 819 at 10 wt % in MEK. The solids weight ratios of PVB to PUA to monomer is given, and calculated as follows: Example 1 contains 11.88 g of 25 wt % solution of Mowital B 14 S, corresponding to 2.97 g solids. It also contains 3.60 g of 33.3 wt % solution of PUA F, corresponding to 1.19 g solids. Example 1 also contains 1.78 g of the CN3100 monomer. The total amount of solids (excluding Irgacure 819) was thus 2.97 g+1.19 g+1.78 g, or 5.94 g. All solutions were adjusted to 30 wt % solids in MEK, unless otherwise noted, and the grams of MEK added or removed (positive or negative value, respectively) to reach 30 wt % solids is given. In Example 1, the solids of Irgacure 819 was 0.1 g/g solution times 0.59 g solution=0.059 g Irgacure 819. The total solids for Example 1 was 5.94 g+0.059 g, or 6.00 g.

Test specimens were prepared using the adhesive solutions provided in Table 3 by coating each adhesive solution on the primed side of 2 mil plasma primed PET film using a knife coater with a 25 mil gap. The coated PET film was air dried for about 10 minutes before being placed in a 65° C. oven for 10 minutes. The sample was then taped onto a stainless steel plate pre-heated to 90° C. for about 90 sec and a second piece of 2 mil SSP PET film was then laminated on its primed side to the coating. The PET-coating-PET laminate was then cured using a Light-Hammer 6 UV curing system (Fusion UV Systems Inc., Gaithersburg, Md.) equipped with a D bulb operating under nitrogen atmosphere at 100% lamp power at a line speed of 20 feet/min using 1 pass.

The percent transmission (% T), haze (% H) and clarity (% C) for each test specimen, and adhesion values for selected Examples and Comparative Examples, are provided in Table 4. If a test specimen did not have desired optical properties, adhesion was usually not tested. Those specimens with % T of at least 88%, % H of 6% or less, and % C of at least 98%, and having adhesion of 100 g/cm or greater are considered to be Examples of the invention.

TABLE 3

Adhesive Formulations Comprising PVB, Polyurethane Acrylates, and Monomers

| Example | PVB | Wt % solids in PVB solution | Grams PVB solution | Polyurethane Acrylate Identifier | Polyurethane Acrylate, grams solution | Monomer | Grams monomer | Grams Irgacure 819 solution | Ratio of PVB:PUA:Monomer |
|---|---|---|---|---|---|---|---|---|---|
| Comparative Example 1 | B 14 S | 25 | 11.88 | B | 2.38 | CN3100 | 1.78 | 0.59 | 50:20:30 |
| Comparative Example 2 | B 14 S | 25 | 11.88 | D | 2.38 | CN3100 | 1.78 | 0.59 | 50:20:30 |
| Comparative Example 3 | B 14 S | 25 | 11.88 | E | 2.38 | CN3100 | 1.78 | 0.59 | 50:20:30 |
| Example 1 | B 14 S | 25 | 11.88 | F | 3.6 | CN3100 | 1.78 | 0.59 | 50:20:30 |
| Comparative Example 4 | B 14 S | 25 | 11.88 | G | 2.38 | CN3100 | 1.78 | 0.59 | 50:20:30 |
| Example 2 | B 14 S | 25 | 11.88 | H | 2.38 | CN3100 | 1.78 | 0.59 | 50:20:30 |
| Comparative Example 5 | B 14 S | 25 | 11.88 | I | 2.38 | CN3100 | 1.78 | 0.59 | 50:20:30 |
| Comparative Example 6 | B 14 S | 25 | 11.88 | J | 3.39 | CN3100 | 1.78 | 0.59 | 50:20:30 |
| Example 3 | B 14 S | 25 | 11.88 | K | 3.39 | CN3100 | 1.78 | 0.59 | 50:20:30 |
| Comparative Example 7 | B 14 S | 25 | 11.88 | L | 3.39 | CN3100 | 1.78 | 0.59 | 50:20:30 |
| Comparative Example 8 | B 14 S | 25 | 11.88 | M | 3.39 | CN3100 | 1.78 | 0.59 | 50:20:30 |
| Example 4 | B 14 S | 25 | 11.88 | C | 3.39 | CN3100 | 1.78 | 0.59 | 50:20:30 |
| Example 5 | B 14 S | 30 | 9.90 | C | 6.79 | CN3100 | 0.59 | 0.59 | 50:40:10 |
| Example 6 | B 14 S | 30 | 9.90 | C | 6.79 | CN3100 | 0.59 | 0.59 | 50:40:10 |
| Example 7 | B 14 S | 30 | 9.90 | C | 1.7 | CN3100 | 2.38 | 0.59 | 50:10:40 |
| Example 8 | B 14 S | 30 | 7.92 | C | 5.09 | CN3100 | 1.78 | 0.59 | 40:30:30 |
| Example 9 | B 14 S | 30 | 5.94 | C | 1.7 | CN3100 | 3.56 | 0.59 | 30:10:60 |
| Example 10 | B 14 S | 30 | 5.94 | C | 5.94 | CN3100 | 2.08 | 0.59 | 30:35:35 |
| Example 11 | B 14 S | 30 | 5.94 | C | 10.18 | CN3100 | 0.59 | 0.59 | 30:60:10 |
| Comparative Example 9 | B 14 S | 25 | 11.88 | N | 2.35 | CN3100 | 1.78 | 0.59 | 50:20:30 |
| Comparative Example 10 | B 14 S | 25 | 11.88 | O | 2.35 | CN3100 | 1.78 | 0.59 | 50:20:30 |
| Example 12 | B 14 S | 25 | 11.88 | P | 2.35 | CN3100 | 1.78 | 0.59 | 50:20:30 |
| Comparative Example 11 | B 14 S | 25 | 11.88 | Q | 2.35 | CN3100 | 1.78 | 0.59 | 50:20:30 |
| Comparative Example 12 | B 14 S | 30 | 9.90 | R | 2.38 | CN3100 | 1.78 | 0.59 | 53.2:14.9:31.9 |
| Comparative Example 13 | B 14 S | 30 | 9.90 | S | 2.38 | CN3100 | 1.78 | 0.59 | 53.2:14.9:31.9 |
| Comparative Example 14 | B 14 S | 30 | 9.90 | T | 2.38 | CN3100 | 1.78 | 0.59 | 53.2:14.9:31.9 |
| Example 13 | B 14 S | 30 | 9.90 | U | 2.38 | CN3100 | 1.78 | 0.59 | 53.2:14.9:31.9 |
| Example 14 | B 14 S | 30 | 9.90 | V | 2.38 | CN3100 | 1.78 | 0.59 | 53.2:14.9:31.9 |
| Comparative Example 15 | B 14 S | 30 | 9.90 | CN964 | 2.38 | CN3100 | 1.78 | 0.59 | 50:20:30 |
| Comparative Example 16 | B 14 S | 30 | 9.90 | CN978 | 2.38 | CN3100 | 1.78 | 0.59 | 50:20:30 |

TABLE 3-continued

Adhesive Formulations Comprising PVB, Polyurethane Acrylates, and Monomers

| Example | PVB | Wt % solids in PVB solution | Grams PVB solution | Polyurethane Acrylate Identifier | Polyurethane Acrylate, grams solution | Monomer | Grams monomer | Grams Irgacure 819 solution | Ratio of PVB:PUA:Monomer |
|---|---|---|---|---|---|---|---|---|---|
| Comparative Example 17 | B 14 S | 30 | 9.90 | CN981 | 2.38 | CN3100 | 1.78 | 0.59 | 50:20:30 |
| Comparative Example 18 | B 14 S | 30 | 9.90 | CN991 (100% solids) | 1.19 | CN3100 | 1.78 | 0.59 | 50:20:30 |
| Comparative Example 19 | B 14 S | 30 | 9.90 | CN9002 | 2.38 | CN3100 | 1.78 | 0.59 | 50:20:30 |
| Comparative Example 20 | B 14 S | 30 | 9.90 | CN9004 | 2.38 | CN3100 | 1.78 | 0.59 | 50:20:30 |
| Comparative Example 21 | B 16 H | 30 | 9.90 | H | 2.38 | CN3100 | 1.78 | 0.59 | 50:20:30 |
| Comparative Example 22 | B 16 H | 30 | 9.90 | L | 3.39 | CN3100 | 1.78 | 0.59 | 50:20:30 |
| Comparative Example 23 | B 16 H | 30 | 9.90 | C | 6.79 | CN3100 | 0.59 | 0.59 | 50:40:10 |
| Comparative Example 24 | B 16 H | 25 | 11.88 | C | 3.39 | CN3100 | 1.78 | 0.59 | 50:20:30 |
| Comparative Example 25 | B 16 H | 30 | 9.90 | C | 1.7 | CN3100 | 2.38 | 0.59 | 50:10:40 |
| Comparative Example 26 | B 16 H | 30 | 7.92 | C | 5.09 | CN3100 | 1.78 | 0.59 | 40:30:30 |
| Comparative Example 27 | B 20 H | 25 | 11.88 | B | 3.6 | CN3100 | 1.78 | 0.59 | 50:20:30 |
| Comparative Example 28 | B 20 H | 25 | 11.88 | D | 2.38 | CN3100 | 1.78 | 0.59 | 50:20:30 |
| Comparative Example 29 | B 20 H | 25 | 11.88 | E | 2.38 | CN3100 | 1.78 | 0.59 | 50:20:30 |
| Comparative Example 30 | B 20 H | 25 | 11.88 | F | 2.38 | CN3100 | 1.78 | 0.59 | 50:20:30 |
| Comparative Example 31 | B 20 H | 25 | 11.88 | G | 2.38 | CN3100 | 1.78 | 0.59 | 50:20:30 |
| Comparative Example 32 | B 20 H | 25 | 11.88 | H | 2.38 | CN3100 | 1.78 | 0.59 | 50:20:30 |
| Comparative Example 33 | B 20 H | 25 | 11.88 | I | 2.38 | CN3100 | 1.78 | 0.59 | 50:20:30 |
| Comparative Example 34 | B 20 H | 25 | 11.88 | J | 2.38 | CN3100 | 1.78 | 0.59 | 50:20:30 |
| Comparative Example 35 | B 20 H | 25 | 11.88 | K | 2.38 | CN3100 | 1.78 | 0.59 | 50:20:30 |
| Comparative Example 36 | B 20 H | 25 | 11.88 | L | 2.38 | CN3100 | 1.78 | 0.59 | 50:20:30 |
| Comparative Example 37 | B 20 H | 25 | 11.88 | F | 2.38 | CN3100 | 1.78 | 0.59 | 50:20:30 |
| Comparative Example 38 | B 20 H | 30 | 9.90 | C | 6.79 | CN3100 | 0.59 | 0.59 | 50:40:10 |
| Comparative Example 39 | B 20 H | 30 | 9.90 | C | 3.39 | CN3100 | 1.78 | 0.59 | 50:20:30 |
| Comparative Example 40 | B 20 H | 30 | 9.90 | C | 1.7 | CN3100 | 2.38 | 0.59 | 50:10:40 |
| Comparative Example 41 | B 20 H | 30 | 7.92 | C | 5.09 | CN3100 | 1.78 | 0.59 | 40:30:30 |
| Comparative Example 42 | B 20 H | 25 | 11.88 | N | 2.38 | CN3100 | 1.78 | 0.59 | 50:20:30 |
| Comparative Example 43 | B 20 H | 25 | 11.88 | O | 2.38 | CN3100 | 1.78 | 0.59 | 50:20:30 |
| Comparative Example 44 | B 20 H | 25 | 11.88 | P | 2.38 | CN3100 | 1.78 | 0.59 | 50:20:30 |
| Example 15 | B 20 H | 25 | 11.88 | Q | 2.38 | CN3100 | 1.78 | 0.59 | 50:20:30 |
| Comparative Example 45 | B 30 H | 25 | 11.88 | C | 3.39 | CN3100 | 1.78 | 0.59 | 50:20:30 |
| Comparative Example 46 | BL 16 H | 25 | 11.88 | H | 2.38 | CN3100 | 1.78 | 0.59 | 50:20:30 |
| Comparative Example 47 | BL 16 H | 25 | 11.88 | L | 3.39 | CN3100 | 1.78 | 0.59 | 50:20:30 |
| Comparative Example 48 | BL 16 H | 25 | 11.88 | C | 1.7 | CN3100 | 2.38 | 0.59 | 50:10:40 |
| Comparative Example 49 | B-76 | 25 | 11.88 | C | 3.39 | CN3100 | 1.78 | 0.59 | 50:20:30 |
| Comparative Example 50 | B 30 H | 20 | 10 | C (50% solids) | 1.6 | CN3100 | 1.2 | 0.2 | 50:20:30 |
| Comparative Example 51 | B 60 H | 15 | 13.3 | C (50% solids) | 1.6 | CN3100 | 1.2 | 0.2 | 50:20:30 |
| Comparative Example 52 | B-79 | 20 | 10 | C (50% solids) | 1.6 | CN3100 | 1.2 | 0.2 | 50:20:30 |
| Comparative Example 53 | B-98 | 20 | 10 | C (50% solids) | 1.6 | CN3100 | 1.2 | 0.2 | 50:20:30 |
| Example 16 | B 14 S | 25 | 11.88 | C | 3.39 | CD553 | 1.78 | 0.59 | 50:20:30 |
| Comparative Example 54 | B 16 H | 30 | 9.9 | C | 6.79 | CD553 | 0.59 | 0.59 | 50:40:10 |
| Comparative Example 55 | B 16 H | 30 | 9.9 | C | 3.39 | CD553 | 1.78 | 0.59 | 50:20:30 |
| Comparative Example 56 | B 16 H | 30 | 9.9 | C | 1.7 | CD553 | 2.38 | 0.59 | 50:10:40 |
| Comparative Example 57 | B 16 H | 30 | 7.92 | C | 5.09 | CD553 | 1.78 | 0.59 | 40:30:30 |
| Comparative Example 58 | B 20 H | 30 | 9.9 | C | 6.79 | CD553 | 0.59 | 0.59 | 50:40:10 |
| Comparative Example 59 | B 20 H | 30 | 9.9 | C | 3.39 | CD553 | 1.78 | 0.59 | 50:20:30 |
| Comparative Example 60 | B 20 H | 30 | 9.9 | C | 1.7 | CD553 | 2.38 | 0.59 | 50:10:40 |
| Comparative Example 61 | B 20 H | 30 | 7.92 | C | 5.09 | CD553 | 1.78 | 0.59 | 40:30:30 |
| Example 17 | B 14 S | 25 | 11.88 | C | 3.88 | SR504 | 1.78 | 0.59 | 50:20:30 |
| Comparative Example 62 | B 16 H | 30 | 9.9 | C | 6.79 | SR504 | 0.59 | 0.59 | 50:40:10 |
| Comparative Example 63 | B 16 H | 30 | 9.9 | C | 3.39 | SR504 | 1.78 | 0.59 | 50:20:30 |
| Example 18 | B 16 H | 30 | 9.9 | C | 1.7 | SR504 | 2.38 | 0.59 | 50:10:40 |
| Comparative Example 64 | B 16 H | 30 | 7.92 | C | 5.09 | SR504 | 1.78 | 0.59 | 40:30:30 |
| Comparative Example 65 | B 20 H | 30 | 9.9 | C | 6.79 | SR504 | 0.59 | 0.59 | 50:40:10 |
| Example 19 | B 20 H | 30 | 9.9 | C | 3.39 | SR504 | 1.78 | 0.59 | 50:20:30 |
| Example 20 | B 20 H | 30 | 9.9 | C | 1.7 | SR504 | 2.38 | 0.59 | 50:10:40 |
| Comparative Example 66 | B 20 H | 30 | 7.92 | C | 5.09 | SR504 | 1.78 | 0.59 | 40:30:30 |
| Comparative Example 67 | BL 16 H | 25 | 11.88 | C | 3.39 | SR504 | 1.78 | 0.59 | 50:20:30 |
| Example 21 | B 14 S | 25 | 11.88 | B | 2.38 | SR9050 | 1.78 | 0.59 | 50:20:30 |
| Example 22 | B 14 S | 25 | 11.88 | D | 2.38 | SR9050 | 1.78 | 0.59 | 50:20:30 |
| Comparative Example 68 | B 14 S | 25 | 11.88 | G | 2.38 | SR9050 | 1.78 | 0.59 | 50:20:30 |
| Example 23 | B 14 S | 25 | 11.88 | H | 2.38 | SR9050 | 1.78 | 0.59 | 50:20:30 |
| Example 24 | B 14 S | 30 | 13.86 | C | 2.55 | SR9050 | 0.89 | 0.59 | 70:15:15 |
| Example 25 | B 14 S | 30 | 11.88 | C | 3.39 | SR9050 | 1.19 | 0.59 | 60:20:20 |
| Example 26 | B 14 S | 25 | 11.88 | C | 3.39 | SR9050 | 1.78 | 0.59 | 50:20:30 |
| Example 27 | B 14 S | 30 | 5.94 | C | 5.94 | SR9050 | 2.08 | 0.59 | 30:35:35 |
| Example 28 | B 14 S | 25 | 11.88 | N | 2.38 | SR9050 | 1.78 | 0.59 | 50:20:30 |
| Example 29 | B 14 S | 25 | 11.88 | Q | 2.38 | SR9050 | 1.78 | 0.59 | 50:20:30 |
| Example 30 | B 14 S | 30 | 9.90 | R | 2.38 | SR9050 | 1.78 | 0.59 | 53.2:14.9:31.9 |

TABLE 3-continued

Adhesive Formulations Comprising PVB, Polyurethane Acrylates, and Monomers

| Example | PVB | Wt % solids in PVB solution | Grams PVB solution | Polyurethane Acrylate Identifier | Polyurethane Acrylate, grams solution | Monomer | Grams monomer | Grams Irgacure 819 solution | Ratio of PVB:PUA:Monomer |
|---|---|---|---|---|---|---|---|---|---|
| Example 31 | B 14 S | 30 | 9.90 | S | 2.38 | SR9050 | 1.78 | 0.59 | 53.2:14.9:31.9 |
| Example 32 | B 14 S | 30 | 9.90 | T | 2.38 | SR9050 | 1.78 | 0.59 | 53.2:14.9:31.9 |
| Example 33 | B 14 S | 30 | 9.90 | U | 2.38 | SR9050 | 1.78 | 0.59 | 53.2:14.9:31.9 |
| Comparative Example 69 | B 14 S | 30 | 9.90 | V | 2.38 | SR9050 | 1.78 | 0.59 | 53.2:14.9:31.9 |
| Example 34 | B 14 S | 30 | 9.90 | A | 2.38 | SR9050 | 1.78 | 0.59 | 50:20:30 |
| Example 35 | B 16 H | 25 | 11.88 | D | 2.38 | SR9050 | 1.78 | 0.59 | 50:20:30 |
| Comparative Example 70 | B 16 H | 25 | 11.88 | E | 2.38 | SR9050 | 1.78 | 0.59 | 50:20:30 |
| Example 36 | B 16 H | 25 | 11.88 | F | 3.6 | SR9050 | 1.78 | 0.59 | 50:20:30 |
| Comparative Example 71 | B 16 H | 25 | 11.88 | G | 2.38 | SR9050 | 1.78 | 0.59 | 50:20:30 |
| Example 37 | B 16 H | 25 | 11.88 | H | 2.38 | SR9050 | 1.78 | 0.59 | 50:20:30 |
| Comparative Example 72 | B 16 H | 25 | 11.88 | I | 2.38 | SR9050 | 1.78 | 0.59 | 50:20:30 |
| Example 38 | B 16 H | 25 | 11.88 | J | 3.39 | SR9050 | 1.78 | 0.59 | 50:20:30 |
| Example 39 | B 16 H | 25 | 11.88 | K | 3.39 | SR9050 | 1.78 | 0.59 | 50:20:30 |
| Example 40 | B 16 H | 25 | 11.88 | L | 3.39 | SR9050 | 1.78 | 0.59 | 50:20:30 |
| Example 41 | B 16 H | 25 | 11.88 | M | 3.39 | SR9050 | 1.78 | 0.59 | 50:20:30 |
| Comparative Example 73 | B 16 H | 30 | 13.86 | C | 2.55 | SR9050 | 0.89 | 0.59 | 70:15:15 |
| Example 42 | B 16 H | 30 | 11.88 | C | 3.39 | SR9050 | 1.19 | 0.59 | 60:20:20 |
| Comparative Example 74 | B 16 H | 30 | 9.90 | C | 6.79 | SR9050 | 0.59 | 0.59 | 50:40:10 |
| Example 43 | B 16 H | 30 | 9.90 | C | 3.39 | SR9050 | 1.78 | 0.59 | 50:20:30 |
| Example 44 | B 16 H | 30 | 10.00 | C | 1.70 | SR9050 | 2.4 | 0.59 | 50:10:40 |
| Example 45 | B 16 H | 30 | 7.92 | C | 5.09 | SR9050 | 1.78 | 0.59 | 40:30:30 |
| Comparative Example 75 | B 16 H | 30 | 5.94 | C | 10.18 | SR9050 | 0.59 | 0.59 | 30:60:10 |
| Example 46 | B 16 H | 30 | 5.94 | C | 5.94 | SR9050 | 2.08 | 0.59 | 30:35:35 |
| Example 47 | B 16 H | 30 | 5.94 | C | 1.70 | SR9050 | 3.56 | 0.59 | 30:10:60 |
| Example 48 | B 16 H | 25 | 11.88 | Q | 3.39 | SR9050 | 1.78 | 0.59 | 50:20:30 |
| Example 49 | B 20 H | 25 | 11.88 | B | 3.60 | SR9050 | 1.78 | 0.59 | 50:20:30 |
| Example 50 | B 20 H | 25 | 11.88 | D | 2.38 | SR9050 | 1.78 | 0.59 | 50:20:30 |
| Comparative Example 76 | B 20 H | 25 | 11.88 | E | 2.38 | SR9050 | 1.78 | 0.59 | 50:20:30 |
| Example 51 | B 20 H | 25 | 11.88 | F | 3.6 | SR9050 | 1.78 | 0.59 | 50:20:30 |
| Comparative Example 77 | B 20 H | 25 | 11.88 | G | 2.38 | SR9050 | 1.78 | 0.59 | 50:20:30 |
| Example 52 | B 20 H | 25 | 11.88 | H | 2.38 | SR9050 | 1.78 | 0.59 | 50:20:30 |
| Comparative Example 78 | B 20 H | 25 | 11.88 | I | 2.38 | SR9050 | 1.78 | 0.59 | 50:20:30 |
| Example 53 | B 20 H | 25 | 11.88 | J | 3.39 | SR9050 | 1.78 | 0.59 | 50:20:30 |
| Example 54 | B 20 H | 25 | 11.88 | K | 3.39 | SR9050 | 1.78 | 0.59 | 50:20:30 |
| Example 55 | B 20 H | 25 | 11.88 | L | 3.39 | SR9050 | 1.78 | 0.59 | 50:20:30 |
| Comparative Example 79 | B 20 H | 25 | 11.88 | M | 3.39 | SR9050 | 1.78 | 0.59 | 50:20:30 |
| Comparative Example 80 | B 20 H | 30 | 13.86 | C | 2.55 | SR9050 | 0.89 | 0.59 | 70:15:15 |
| Comparative Example 81 | B 20 H | 30 | 11.88 | C | 3.39 | SR9050 | 1.19 | 0.59 | 60:20:20 |
| Comparative Example 82 | B 20 H | 30 | 9.90 | C | 6.79 | SR9050 | 0.59 | 0.59 | 50:40:10 |
| Example 56 | B 20 H | 25 | 11.88 | C | 3.39 | SR9050 | 1.78 | 0.59 | 50:20:30 |
| Example 57 | B 20 H | 30 | 9.9 | C | 1.7 | SR9050 | 2.38 | 0.59 | 50:10:40 |
| Example 58 | B 20 H | 30 | 7.92 | C | 5.09 | SR9050 | 1.78 | 0.59 | 40:30:30 |
| Comparative Example 83 | B 20 H | 30 | 5.94 | C | 10.18 | SR9050 | 0.59 | 0.59 | 30:60:10 |
| Comparative Example 84 | B 20 H | 30 | 5.94 | C | 5.94 | SR9050 | 2.08 | 0.59 | 30:35:35 |
| Example 59 | B 20 H | 30 | 5.94 | C | 1.70 | SR9050 | 3.56 | 0.59 | 30:10:60 |
| Example 60 | B 20 H | 25 | 11.88 | N | 2.38 | SR9050 | 1.78 | 0.59 | 50:20:30 |
| Comparative Example 85 | BL 16 H | 25 | 11.88 | C | 3.39 | SR9050 | 1.78 | 0.59 | 50:20:30 |
| Example 61 | B 14 S | 30 | 9.90 | C | 3.39 | CD406 (40 wt % in MEK) | 4.46 | 0.59 | 50:20:30 |
| Example 62 | B 14 S | 30 | 9.90 | C | 3.39 | CD561 | 1.78 | 0.59 | 50:20:30 |
| Comparative Example 86 | B 14 S | 30 | 9.90 | C | 3.39 | CD9075 | 1.78 | 0.59 | 50:20:30 |
| Example 63 | B 14 S | 30 | 9.90 | C | 3.39 | Genorad 1122 | 1.78 | 0.59 | 50:20:30 |
| Comparative Example 87 | B 14 S | 30 | 9.90 | C | 3.39 | SR256 | 1.78 | 0.59 | 50:20:30 |
| Comparative Example 88 | B 14 S | 30 | 9.90 | C | 3.39 | SR285 | 1.78 | 0.59 | 50:20:30 |
| Comparative Example 89 | B 14 S | 30 | 9.90 | C | 3.39 | SR335 | 1.78 | 0.59 | 50:20:30 |
| Comparative Example 90 | B 14 S | 30 | 9.90 | C | 3.39 | SR506 | 1.78 | 0.59 | 50:20:30 |
| Comparative Example 91 | B 14 S | 30 | 9.90 | C | 3.39 | SR611 | 1.78 | 0.59 | 50:20:30 |
| Example 64 | B 14 S | 30 | 9.90 | C | 3.39 | SR238 | 1.78 | 0.59 | 50:20:30 |
| Example 65 | B 14 S | 30 | 9.90 | C | 3.39 | SR339 | 1.78 | 0.59 | 50:20:30 |
| Comparative Example 92 | B 14 S | 30 | 9.90 | C | 3.39 | SR602 | 1.78 | 0.59 | 50:20:30 |
| Example 66 | B 14 S | 30 | 9.90 | C | 3.39 | SR9087 | 1.78 | 0.59 | 50:20:30 |
| Comparative Example 93 | B 16 H | 30 | 9.9 | C | 3.39 | CD406 (40 wt % in MEK) | 4.46 | 0.59 | 50:20:30 |
| Comparative Example 94 | B 16 H | 30 | 9.9 | C | 3.39 | CD561 | 1.78 | 0.59 | 50:20:30 |
| Example 67 | B 16 H | 30 | 9.9 | C | 3.39 | Genorad 2250 | 1.78 | 0.59 | 50:20:30 |
| Comparative Example 95 | B 16 H | 30 | 9.9 | C | 3.39 | SR238 | 1.78 | 0.59 | 50:20:30 |
| Example 68 | B 16 H | 30 | 9.9 | C | 3.39 | SR339 | 1.78 | 0.59 | 50:20:30 |
| Comparative Example 96 | B 16 H | 30 | 10.09 | C | 3.46 | SR602 | 1.82 | 0.61 | 50:20:30 |
| Example 69 | B 16 H | 30 | 9.9 | C | 3.39 | SR9087 | 1.78 | 0.59 | 50:20:30 |
| Comparative Example 98 | B 20 H | 30 | 9.9 | C | 3.39 | CD406 (40 wt % in MEK) | 4.46 | 0.59 | 50:20:30 |
| Example 70 | B 20 H | 30 | 9.9 | C | 3.39 | CD561 | 1.78 | 0.59 | 50:20:30 |
| Example 71 | B 20 H | 30 | 9.9 | C | 3.39 | Genorad 2250 | 1.78 | 0.59 | 50:20:30 |

TABLE 3-continued

Adhesive Formulations Comprising PVB, Polyurethane Acrylates, and Monomers

| Example | PVB | Wt % solids in PVB solution | Grams PVB solution | Polyurethane Acrylate Identifier | Polyurethane Acrylate, grams solution | Monomer | Grams monomer | Grams Irgacure 819 solution | Ratio of PVB:PUA:Monomer |
|---|---|---|---|---|---|---|---|---|---|
| Example 72 | B 20 H | 30 | 9.9 | C | 3.39 | SR238 | 1.78 | 0.59 | 50:20:30 |
| Example 73 | B 20 H | 30 | 9.9 | C | 3.39 | SR339 | 1.78 | 0.59 | 50:20:30 |
| Comparative Example 99 | B 20 H | 30 | 9.9 | C | 3.39 | SR602 | 1.78 | 0.59 | 50:20:30 |
| Example 74 | B 20 H | 30 | 9.9 | C | 3.39 | SR9087 | 1.78 | 0.59 | 50:20:30 |

TABLE 4

Optical Properties and Peel Adhesion

| Example | T (%) | H (%) | C (%) | Adhesion (g/cm) |
|---|---|---|---|---|
| Comparative Example 1 | 89.5 | 1.3 | 99.7 | 56 |
| Comparative Example 2 | 89.1 | 4.23 | 88.5 | 21 |
| Comparative Example 3 | 89.4 | 11.6 | 78.0 | No data |
| Example 1 | 89.7 | 1.02 | 100.0 | 164 |
| Comparative Example 4 | 89.7 | 1.78 | 98.7 | 23 |
| Example 2 | 88.4 | 2.63 | 100.0 | 500 |
| Comparative Example 5 | 84.8 | 2.46 | 94.8 | 174 |
| Comparative Example 6 | 87.5 | 25.5 | 99.4 | No data |
| Example 3 | 88.6 | 0.69 | 100.0 | 162 |
| Comparative Example 7 | 89.3 | 0.73 | 95.1 | 413 |
| Comparative Example 8 | 88.7 | 45 | 99.6 | No data |
| Example 4 | 88.1 | 0.8 | 99.4 | 491 |
| Example 5 | 89 | 4.85 | 99.2 | 864 |
| Example 6 | 89.2 | 5.26 | 98.3 | 577 |
| Example 7 | 89.2 | 0.99 | 99.7 | 251 |
| Example 8 | 89.2 | 1.98 | 100.0 | 156 |
| Example 9 | 89.5 | 1.88 | 99.7 | 169 |
| Example 10 | 88.8 | 0.72 | 100.0 | 307 |
| Example 11 | 89.4 | 0.37 | 100.0 | 111 |
| Comparative Example 9 | 89 | 4.53 | 97.7 | 85 |
| Comparative Example 10 | 89.4 | 1.35 | 99.3 | 60 |
| Example 12 | 89.6 | 1.45 | 100.0 | 110 |
| Comparative Example 11 | 89.5 | 1.55 | 99.7 | 50 |
| Comparative Example 12 | 89.6 | 0.65 | 99.6 | 78 |
| Comparative Example 13 | 89.7 | 0.85 | 99.7 | 51 |
| Comparative Example 14 | 89.6 | 0.92 | 98.9 | 70 |
| Example 13 | 89.9 | 0.87 | 99.7 | 993 |
| Example 14 | 90 | 0.53 | 99.8 | 100 |
| Comparative Example 15 | 89.8 | 1.19 | 100.0 | 81 |
| Comparative Example 16 | 89.8 | 0.52 | 97.8 | 44 |
| Comparative Example 17 | 89.7 | 0.47 | 99.7 | 50 |
| Comparative Example 18 | 89.8 | 0.51 | 99.8 | 24 |
| Comparative Example 19 | 89.3 | 0.84 | 99.7 | 19 |
| Comparative Example 20 | 89.4 | 19.6 | 98.3 | No data |
| Comparative Example 21 | 88.7 | 1.39 | 99.7 | 16 |
| Comparative Example 22 | 88.1 | 2.9 | 100.0 | 25 |
| Comparative Example 23 | 88.3 | 13.6 | 74.9 | No data |
| Comparative Example 24 | 89.3 | 1 | 99.8 | 56 |
| Comparative Example 25 | 89.5 | 0.79 | 100.0 | 23 |
| Comparative Example 26 | 89.2 | 1.58 | 95.6 | 22 |
| Comparative Example 27 | 87.8 | 3.36 | 100.0 | 10 |
| Comparative Example 28 | 89.1 | 52.4 | 80.0 | 13 |
| Comparative Example 29 | 89.5 | 31 | 71.9 | No data |
| Comparative Example 30 | 88.4 | 4.52 | 96.7 | No data |
| Comparative Example 31 | 89.8 | 3.58 | 96.5 | 50 |
| Comparative Example 32 | 89.9 | 1.87 | 100.0 | 6 |
| Comparative Example 33 | 89.6 | 3.72 | 94.8 | No data |
| Comparative Example 34 | 87.7 | 45.8 | 96.0 | No data |
| Comparative Example 35 | 84.5 | 6.22 | 100.0 | No data |
| Comparative Example 36 | 88.6 | 2.32 | 100.0 | 12 |
| Comparative Example 37 | 88.8 | 1.31 | 99.3 | 17 |
| Comparative Example 38 | 88.9 | 8.05 | 83.3 | No data |
| Comparative Example 39 | 88.9 | 1.19 | 99.8 | 11 |
| Comparative Example 40 | 89.1 | 0.58 | 100.0 | 28 |
| Comparative Example 41 | 89.2 | 2.01 | 95.5 | 40 |
| Comparative Example 42 | 89.2 | 30.8 | 88.8 | No data |
| Comparative Example 43 | 87.7 | 4.92 | 100.0 | 17 |
| Comparative Example 44 | 89.5 | 26.5 | 99.8 | No data |
| Example 15 | 88.5 | 2.8 | 99.7 | 696 |
| Comparative Example 45 | 88.7 | 1.59 | 100.0 | 8 |
| Comparative Example 46 | 88.6 | 2.48 | 99.8 | 9 |
| Comparative Example 47 | 89.3 | 6.51 | 100.0 | No data |
| Comparative Example 48 | 89.2 | 3.66 | 99.7 | 70 |
| Comparative Example 49 | 87.9 | 3.45 | 100.0 | 41 |
| Comparative Example 50 | 91.1 | 10.3 | 64.9 | No data |
| Comparative Example 51 | 90.9 | 20.9 | 48.3 | No data |
| Comparative Example 52 | 91.3 | 0.12 | 93.9 | No data |
| Comparative Example 53 | 89.6 | 11.1 | 58.7 | No data |
| Example 16 | 89 | 2.05 | 99.8 | 1600 |
| Comparative Example 54 | 89.2 | 11.9 | 72.7 | No data |
| Comparative Example 55 | 89.2 | 7.05 | 98.9 | No data |
| Comparative Example 56 | 89.6 | 9.54 | 100 | No data |
| Comparative Example 57 | 88.9 | 5.52 | 93.8 | No data |
| Comparative Example 58 | 87.8 | 19.3 | 76.1 | No data |
| Comparative Example 59 | 88.5 | 14.8 | 97.2 | No data |
| Comparative Example 60 | 89 | 6.11 | 99.8 | 59 |
| Comparative Example 61 | 88.8 | 8.81 | 92.6 | No data |
| Example 17 | 89.5 | 0.83 | 97.7 | 2500 |
| Comparative Example 62 | 89.1 | 12.5 | 77.6 | No data |
| Comparative Example 63 | 89.7 | 2.07 | 95.5 | 711 |
| Example 18 | 89.2 | 1.04 | 99.8 | 870 |
| Comparative Example 64 | 89.3 | 3.64 | 86.3 | 64 |
| Comparative Example 65 | 88.8 | 12.8 | 86 | No data |
| Example 19 | 89.2 | 3.02 | 98.3 | 910 |
| Example 20 | 89.3 | 0.74 | 99.8 | 1500 |
| Comparative Example 66 | 89.4 | 2.99 | 91.1 | No data |
| Comparative Example 67 | 89.2 | 5.63 | 86.5 | No data |
| Example 21 | 88.2 | 0.5 | 99.7 | 1073 |
| Example 22 | 88.2 | 1.22 | 99.7 | 1148 |
| Comparative Example 68 | 88.7 | 4.49 | 99.7 | 74 |
| Example 23 | 88.7 | 0.7 | 99.5 | 165 |
| Example 24 | 88.7 | 1.34 | 99.2 | 292 |
| Example 25 | 88.7 | 0.46 | 100 | 1672 |
| Example 26 | 89.5 | 0.54 | 100 | 2500 |
| Example 27 | 89.1 | 1.34 | 99.6 | 146 |
| Example 28 | 88.7 | 0.61 | 100 | 1398 |
| Example 29 | 88.8 | 0.38 | 99.8 | 1355 |
| Example 30 | 89.7 | 0.89 | 99.5 | 971 |
| Example 31 | 89.9 | 0.68 | 99.7 | 936 |
| Example 32 | 89.7 | 0.81 | 99.3 | 497 |
| Example 33 | 89.8 | 1.88 | 99.3 | 927 |
| Comparative Example 69 | 89.4 | 1.74 | 94.4 | No data |
| Example 34 | 89.1 | 3.06 | 99.5 | 224 |
| Example 35 | 88.2 | 0.76 | 99.8 | 1507 |
| Comparative Example 70 | 88.5 | 16.6 | 98 | No data |
| Example 36 | 88.6 | 0.5 | 100 | 628 |
| Comparative Example 71 | 88.4 | 11.87 | 99 | No data |
| Example 37 | 88.7 | 1 | 99.8 | 121 |
| Comparative Example 72 | 88.7 | 4.78 | 90 | No data |
| Example 38 | 88.4 | 1.1 | 99.6 | 1326 |
| Example 39 | 88.8 | 0.56 | 99.8 | 1010 |
| Example 40 | 88.7 | 0.91 | 99.7 | 585 |
| Example 41 | 88.6 | 1.14 | 99.3 | 168 |
| Comparative Example 73 | 88.8 | 0.42 | 99.4 | 38 |
| Example 42 | 88.6 | 1 | 99.2 | 327 |
| Comparative Example 74 | 89.2 | 7.61 | 93.3 | No data |
| Example 43 | 88.8 | 0.8 | 99.8 | 1921 |
| Example 44 | 89.4 | 0.85 | 99.8 | 1500 |

TABLE 4-continued

Optical Properties and Peel Adhesion

| Example | T (%) | H (%) | C (%) | Adhesion (g/cm) |
|---|---|---|---|---|
| Example 45 | 89.1 | 0.92 | 100 | 1840 |
| Comparative Example 75 | 88.7 | 3.93 | 99.6 | 50 |
| Example 46 | 88.4 | 0.89 | 100 | 249 |
| Example 47 | 88.7 | 0.37 | 100 | 246 |
| Example 48 | 88.7 | 0.48 | 99.6 | 1227 |
| Example 49 | 88.7 | 1.56 | 99.4 | 731 |
| Example 50 | 88 | 1.13 | 99.1 | 1346 |
| Comparative Example 76 | 89.3 | 21.3 | 98.1 | 782 |
| Example 51 | 88.8 | 1.1 | 99.6 | 593 |
| Comparative Example 77 | 87.7 | 9.87 | 99.5 | No data |
| Example 52 | 88.6 | 1.17 | 99.1 | 205 |
| Comparative Example 78 | 88.5 | 6.48 | 95.2 | No data |
| Example 53 | 88.9 | 0.77 | 99.7 | 1395 |
| Example 54 | 88.2 | 0.51 | 99.8 | 659 |
| Example 55 | 88.8 | 0.79 | 99.7 | 316 |
| Comparative Example 79 | 88.8 | 0.76 | 99 | 58 |
| Comparative Example 80 | 88.4 | 0.73 | 98.9 | 33 |
| Comparative Example 81 | 88.8 | 0.46 | 99.8 | 13 |
| Comparative Example 82 | 89.2 | 6.85 | 91.8 | No data |
| Example 56 | 88.6 | 1.02 | 99.6 | 2500 |
| Example 57 | 89.2 | 0.53 | 99.7 | 1809 |
| Example 58 | 89.2 | 0.58 | 99.8 | 1554 |
| Comparative Example 83 | 88.8 | 2.62 | 99.7 | 30 |
| Comparative Example 84 | 88.4 | 0.42 | 100 | 13 |
| Example 59 | 88.5 | 0.36 | 100 | 126 |
| Example 60 | 88.6 | 0.62 | 99.6 | 365 |
| Comparative Example 85 | 88.6 | 20.5 | 96.3 | No data |
| Example 61 | 89.1 | 1.04 | 99.8 | 500 |
| Example 62 | 89.7 | 0.90 | 100 | 1500 |
| Comparative Example 86 | 89.1 | 0.8 | 94.2 | 974 |
| Example 63 | 89.5 | 0.76 | 99.7 | 1335 |
| Comparative Example 87 | 88.8 | 6.47 | 86.8 | No data |
| Comparative Example 88 | 88.1 | 4.04 | 80.6 | 1196 |
| Comparative Example 89 | 89.2 | 2.42 | 97 | 495 |
| Comparative Example 90 | 88.0 | 2.55 | 94.3 | 2500 |
| Comparative Example 91 | 89.1 | 1.34 | 93.2 | 1574 |
| Example 64 | 89.5 | 0.59 | 98 | 2000 |
| Example 65 | 89.1 | 0.86 | 98.4 | 2400 |
| Comparative Example 92 | 85.2 | 17.60 | 99 | No data |
| Example 66 | 89.5 | 0.65 | 97.5 | 1220 |
| Comparative Example 93 | 89.4 | 1.07 | 99.7 | 15 |
| Comparative Example 94 | 89.6 | 4.43 | 97.2 | 380 |
| Example 67 | 89.6 | 0.74 | 99.7 | 1713 |
| Comparative Example 95 | 89.7 | 1.04 | 97 | 1000 |
| Example 68 | 89.3 | 1.28 | 99.4 | 1682 |
| Comparative Example 96 | 86.3 | 35.00 | 96.8 | No data |
| Example 69 | 89.6 | 1.08 | 99.1 | 1010 |
| Comparative Example 98 | 89.6 | 0.76 | 99.6 | 12 |
| Example 70 | 89.5 | 4.10 | 99.2 | 367 |
| Example 71 | 89.5 | 0.78 | 99.7 | 1460 |
| Example 72 | 89.7 | 1.21 | 97.8 | 250 |
| Example 73 | 89.2 | 1.91 | 99.5 | 1708 |
| Comparative Example 99 | 88.2 | 51.50 | 99 | No data |
| Example 74 | 89.6 | 1.16 | 99.6 | 1266 |

Although the present invention has been described with reference to preferred embodiments, workers skilled in the art will recognize that changes may be made in form and detail without departing from the spirit and scope of the invention.

What is claimed is:

1. An optically clear, curable adhesive comprising:
a polyvinylbutyral having a dynamic viscosity of between about 9 and about 30 mPa·s and having a polyvinyl alcohol weight percent of between about 14% and about 21%;
a polyurethane (meth)acrylate comprising the reaction product of:
a diol;
at least one diisocyanate; and
a hydroxyfunctional (meth)acrylate or an isocyanato-functional (meth)acrylate;
a (meth)acrylate monomer; and
a photoinitiator;
wherein when the optically clear, curable adhesive is placed between two transparent substrates and made into a laminate, the laminate has a haze of less than about 6%, a transmission of greater than about 88% and optical clarity of greater than about 98% when cured, and
wherein the optically clear, curable adhesive has a peel adhesion of at least about 100 g/cm based on ASTM 3330 when cured.

2. The optically clear, curable adhesive of claim 1, wherein the diol is selected from one of a poly(tetramethylene oxide) diol having a number average molecular weight of about 2,000 g/mol or less, a poly(propylene oxide) diol having a number average molecular weight of about 2,000 g/mol or less, and a polycaprolactone diol having a number average molecular weight of about 2,000 g/mol or less.

3. The optically clear, curable adhesive of claim 1, wherein the at least one diisocyanate is an aliphatic diisocyanate.

4. The optically clear, curable adhesive of claim 1, further comprising a hydroxyfunctional monomer with an aromatic moiety.

5. The optically clear, curable adhesive of claim 1, wherein the polyvinylbutyral has a weight average molecular weight between about 10,000 g/mol and about 25,000 g/mol.

6. The optically clear, curable adhesive of claim 1, wherein the polyurethane (meth)acrylate has a weight average molecular weight between about 2,745 g/mol and about 63,000 g/mol.

7. The optically clear, curable adhesive of claim 1, wherein the polyvinylbutyral has a polyvinyl acetate weight percent of between about 1% and about 8%.

8. The optically clear, curable adhesive of claim 1, wherein the optically clear, curable adhesive comprises between about 30% and about 70% by weight polyvinylbutyral.

9. The optically clear, curable adhesive of claim 1, wherein the optically clear, curable adhesive comprises between about 10% and about 60% by weight polyurethane (meth)acrylate.

10. The optically clear, curable adhesive of claim 1, wherein the optically clear, curable adhesive comprises between about 10% and about 60% by weight (meth)acrylate monomer.

11. The optically clear, curable adhesive of claim 1, wherein the (meth)acrylate monomer comprises at least one of monofunctional or difunctional acrylates.

12. An optically clear laminate comprising:
a first substrate;
a second substrate; and
an optically clear, curable adhesive positioned between the first substrate and the second substrate, the optically clear, curable adhesive comprising:
a polyvinylbutyral having a dynamic viscosity of between about 9 and about 30 mPa·s and having a polyvinyl alcohol weight percent of between about 14% and about 21%;
a polyurethane (meth)acrylate comprising the reaction product of:
a diol;
at least one diisocyanate; and
a hydroxyfunctional (meth)acrylate or an isocyanatofunctional (meth)acrylate;

a (meth)acrylate monomer; and a photoinitiator;

wherein when the optically clear, curable adhesive is placed between two transparent substrates and made into a laminate, the laminate has a haze of less than about 6%, a transmission of greater than about 88% and optical clarity of greater than about 98% when cured, and wherein the optically clear, curable adhesive has a peel adhesion of at least about 100 g/cm based on ASTM 3330 when cured.

13. The optically clear laminate of claim 12, wherein the diol is selected from one of a poly(tetramethylene oxide) diol having a number average molecular weight of about 2,000 g/mol or less, a poly(propylene oxicde) diol having a number average molecular weight of about 2,000 g/mol or less and a polycaprolactone diol having a number average molecular weight of about 2,000 g/mol or less.

14. The optically clear laminate of claim 12, wherein the at least one diisocyanate is an aliphatic diisocyanate.

15. The optically clear laminate of claim 12, wherein the polyvinylbutyral has a weight average molecular weight between about 10,000 g/mol and about 25,000 g/mol.

16. The optically clear laminate of claim 12, wherein the polyurethane (meth)acrylate has a weight average molecular weight between about 2,745 g/mol and about 63,000 g/mol.

17. The optically clear laminate of claim 12, wherein the polyvinylbutyral has a polyvinyl acetate weight percent of between about 1% and about 8%.

18. The optically clear laminate of claim 12, wherein the optically clear, curable adhesive comprises between about 30% and about 70% by weight polyvinylbutyral.

19. The optically clear laminate of claim 12, wherein the optically clear, curable adhesive comprises between about 10% and about 60% by weight polyurethane (meth)acrylate.

20. The optically clear laminate of claim 12, wherein the optically clear, curable adhesive comprises between about 10% and about 60% by weight (meth)acrylate monomer.

* * * * *